United States Patent
Burke (10) Patent No.: US 9,764,689 B2
(45) Date of Patent: Sep. 19, 2017

(54) SYSTEM AND METHOD FOR MONITORING DRIVING BEHAVIOR

(71) Applicant: Myine Electronics, Inc., Ferndale, MI (US)

(72) Inventor: Michael Burke, Detroit, MI (US)

(73) Assignee: Livio, Inc., Royal Oak, MI (US)

(*) Notice: Subject to any disclaimer, the term of this patent is extended or adjusted under 35 U.S.C. 154(b) by 276 days.

(21) Appl. No.: 14/509,157

(22) Filed: Oct. 8, 2014

(65) Prior Publication Data
US 2016/0101729 A1     Apr. 14, 2016

(51) Int. Cl.
| | |
|---|---|
| *B60Q 9/00* | (2006.01) |
| *H04R 29/00* | (2006.01) |
| *G01S 13/08* | (2006.01) |
| *B60W 40/08* | (2012.01) |
| *G01S 13/93* | (2006.01) |

(52) U.S. Cl.
CPC ............ *B60Q 9/008* (2013.01); *B60W 40/08* (2013.01); *G01S 13/931* (2013.01)

(58) Field of Classification Search
CPC ....... B60Q 9/008; G01S 13/08; G01S 13/931; H04R 29/004
See application file for complete search history.

(56) References Cited

U.S. PATENT DOCUMENTS

| | | | |
|---|---|---|---|
| 5,499,182 A | 3/1996 | Ousborne | |
| 6,366,207 B1 * | 4/2002 | Murphy | A61B 5/18 340/540 |
| 6,392,564 B1 | 5/2002 | Mackey et al. | |
| 8,239,015 B2 | 8/2012 | Morikawa et al. | |
| 8,352,118 B1 | 1/2013 | Mittelsteadt et al. | |
| 8,818,681 B1 * | 8/2014 | Dolgov | G05D 1/0055 180/167 |
| 8,818,682 B1 * | 8/2014 | Dolgov | G05D 1/0055 180/167 |
| 9,050,977 B1 * | 6/2015 | Dolgov | G05D 1/0055 |
| 2002/0105423 A1 * | 8/2002 | Rast | G08G 1/162 340/479 |
| 2008/0297330 A1 | 12/2008 | Jeon | |
| 2011/0063099 A1 * | 3/2011 | Miller | G06F 17/00 340/439 |
| 2012/0166057 A1 * | 6/2012 | Amato | B60K 31/0058 701/96 |

(Continued)

FOREIGN PATENT DOCUMENTS

| | | | |
|---|---|---|---|
| CN | 203093873 U | * | 7/2013 |
| CN | 103832357 A | * | 6/2014 |

*Primary Examiner* — Thomas G Black
*Assistant Examiner* — Ce Li
(74) *Attorney, Agent, or Firm* — Jennifer M. Stec; Brooks Kushman P.C.

(57) ABSTRACT

A vehicle computing system for a vehicle includes a radar system, a microphone, and at least one controller. The radar system is configured to measure a distance to a frontward-vehicle. The microphone is configured to measure vehicle cabin noise. The controller is configured to output a tailgating event when the measured distance to the frontward-vehicle is less than a predefined threshold value. The controller may be further configured to request cabin noise from the microphone based on the tailgating event. If the noise is greater than a threshold value, the controller may output an alert message.

20 Claims, 6 Drawing Sheets

(56) References Cited

U.S. PATENT DOCUMENTS

| | | | |
|---|---|---|---|
| 2013/0057397 A1* | 3/2013 | Cutler | B62D 15/0255 340/435 |
| 2013/0338914 A1* | 12/2013 | Weiss | G08G 1/09626 701/465 |
| 2014/0046701 A1* | 2/2014 | Steinberg | G06Q 40/08 705/4 |
| 2014/0074356 A1 | 3/2014 | Bone et al. | |
| 2014/0236414 A1* | 8/2014 | Droz | B60W 30/00 701/28 |

* cited by examiner

SYSTEM AND METHOD FOR MONITORING DRIVING BEHAVIOR

TECHNICAL FIELD

The present disclosure relates to a system and method for monitoring driver behavior, more particularly, a driver monitoring arrangement and methodology therefore.

BACKGROUND

There have been several systems implemented in vehicles to assist a driver traveling over a roadway so as to maximize the driving comfort and minimize the driving risks. These systems may be implemented to monitor and automatically report driving behavior. The monitoring of driver behavior may assist the driver. For example, the vehicle driver is required to pay attention to both the vehicle in the current lane and the vehicle or vehicles in the surrounding lanes so that the driver may not interfere with the surrounding vehicles. This may cause significant stress to the driver that may lead to aggressive driving maneuvers. There is a demand for systems that assist the vehicle driver in operating a vehicle in an optimum fashion while monitoring driving behavior to eliminate the aggressive driving maneuvers.

SUMMARY

One embodiment of the present disclosure includes a vehicle computing system for a vehicle includes a radar system, a microphone, and at least one controller. The radar system configured to measure a distance to a frontward-vehicle. The microphone is configured to measure cabin noise. The controller is configured to output a tailgating indicator when the measured distance is less than a pre-defined frontward-vehicle threshold. The controller may be further configured to measure cabin noise from the microphone based on the tailgating event. If the noise is greater than a threshold value, the controller may output an alert message.

One embodiment of the present disclosure includes a non-transitory computer-readable storage medium, storing instructions, which, when executed by a vehicle computing system, cause the system to perform a method for detecting a tailgating event based on data from a radar system. The method may compare vehicle-cabin volume to a threshold value via a microphone during the tailgating event. The method may output a remedial action based on the vehicle-cabin volume exceeding the threshold value.

One embodiment of the present disclosure includes an aggressive driving detection method for detecting a tailgating event based on a distance to a frontward vehicle, via a radar system, when the distance is less than a predefined frontward-vehicle threshold. In response to detecting the tailgating event, the method may request in-vehicle cabin noise from a microphone. The method may output an alert message if the noise is greater than a threshold value.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The disclosure relates to a system and method for analyzing driving habits via vehicle systems and sensors. The system and method disclosed may monitor and determine whether a driver is operating a vehicle in an aggressive manner. The monitored data may be aggregated and saved at the vehicle or on some remote server for further analysis of the data.

The disclosure may utilize existing systems and sensors that the vehicle is currently equipped with. For example, a microphone input may be utilized to detect aggressive driving behavior when the driver starts yelling in the vehicle cabin. In another example, the system may monitor turn signals and radar devices to detect when a driver cuts off another driver, turns without signaling, and/or is tailgating a frontward vehicle.

The system may provide remedial actions based on the monitored driving habits. For example, the system may calculate via a front-facing radar that the driver is tailgating the vehicle in front of them and disable the accelerator pedal input until the driver is at a safe distance away. In another example, the use of a driver facing camera may be utilized to determine if the driver is distracted, sleeping, and/or looking away from the road. Based on the monitored driving information, the vehicle computing system may transmit remedial actions to the powertrain system.

Figure 1:
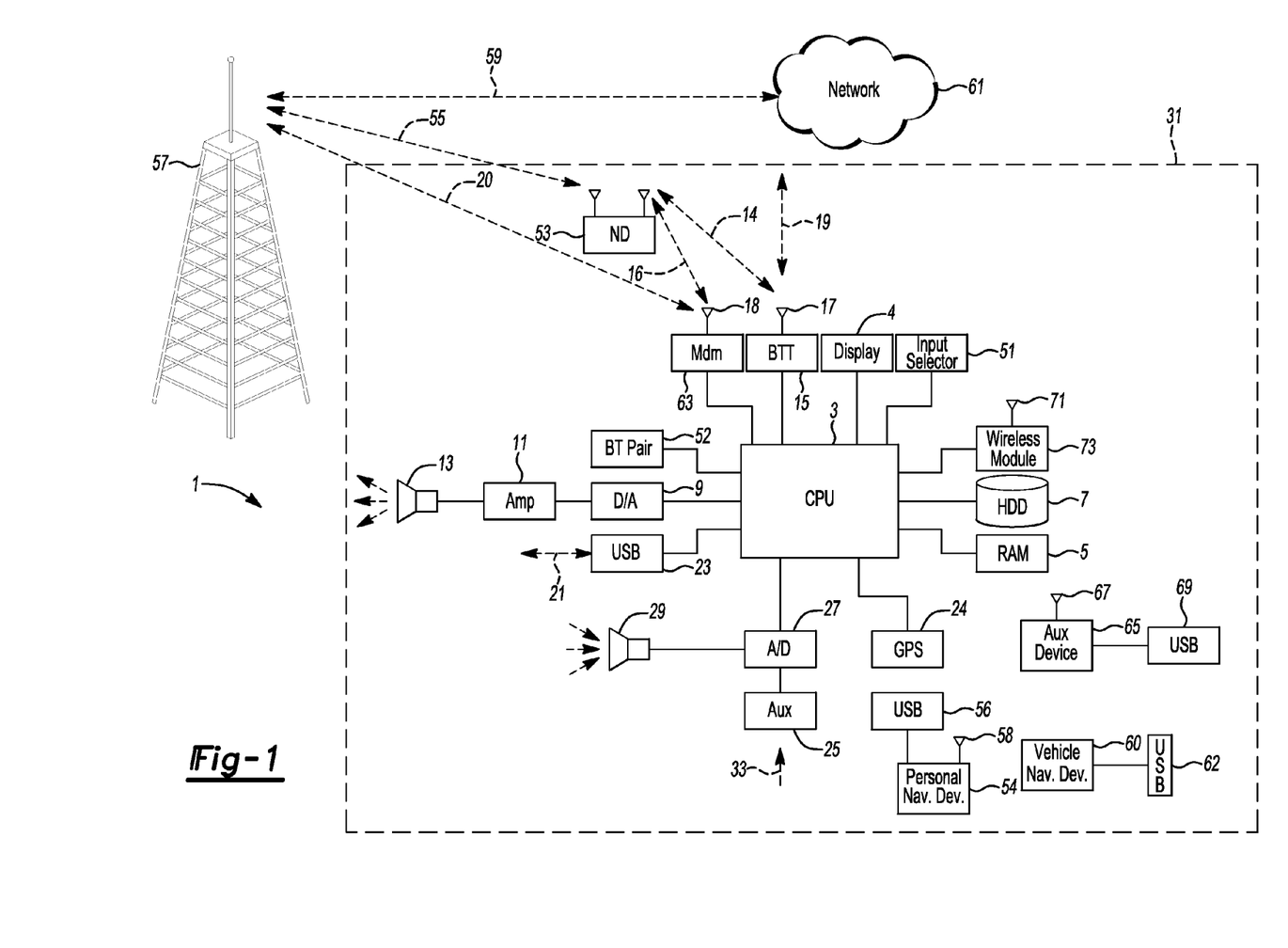
FIG. 1 illustrates an example block topology for a vehicle-based computing system for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof). For example, the VCS 1 may be in communication with a radar system via the vehicle network. The radar system may comprise a front radar, a rear radar, a side detection device, and/or a combination thereof.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2A:
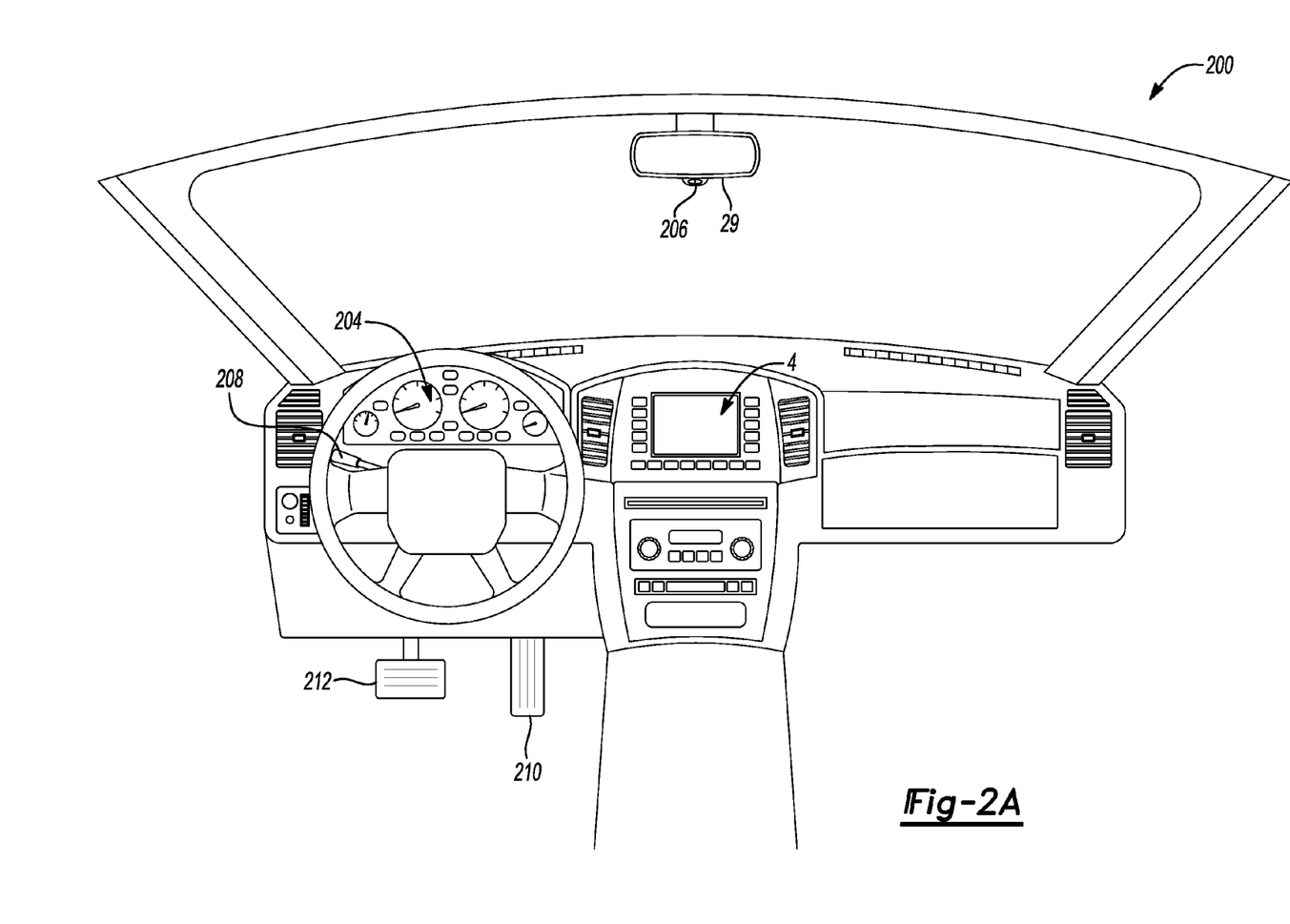
FIG. 2A illustrates a vehicle interior component for use with the vehicle-based computing system to monitor driver behavior.

FIG. 2A illustrates a vehicle cabin 200 comprising vehicle interior components for use with the vehicle-based computing system 1. The vehicle interior components may include a microphone 29 placed anywhere within the vehicle cabin 200. In this embodiment, the microphone 29 is embedded with the rearview mirror assembly. Other vehicle interior components may include, but are not limited to, a driver-facing camera 206, infotainment display 4, instrument cluster 204, turn signal lever 208, accelerator pedal 210 and brake pedal 212.

The VCS 1 may communicate with the vehicle interior components to analyze and manage driving behavior habits. The VCS 1 may monitor the accelerator pedal 210 input, brake pedal 212 input, and microphone 29 input to detect aggressive driving behavior. For example, the VCS 1 may compare the accelerator pedal 210 and brake pedal 212 input to one or more threshold values to determine excessive braking and acceleration. In one example, the VCS 1 may count the number of times the driver pushes on the accelerator pedal 210 and the brake pedal 212 within a predefined window of time. The excessive braking and acceleration via the pedal 210 212 may indicate an aggressive driving maneuver.

The microphone 29 may be used to measure an amplitude of sound such that the VCS 1 may determine an amount of noise within the vehicle cabin 200. For example, if the radio is on, the microphone 29 may measure the amplitude of sound and subtract the radio noise. In another example, there may be a microphone designated for engine noise, and/or wind noise, the microphone 29 may measure the amplitude of sound and subtract the engine noise and/or wind noise. The VCS 1 may compare the amplitude of sound level (e.g., amount of noise) to a threshold value to determine driver excitement. In response to the accelerator pedal 210, brake pedal 212, and/or microphone 29 inputs, the VCS 1 may measure aggressive driving. The VCS 1 may transmit one or more remedial actions in response to one or more threshold values exceeding values that would predict aggressive driving. The one or more remedial actions may include, but is not limited to, an output of a message at the display 4, the instrument panel 204, and/or a combination thereof. The remedial actions may also include limiting the accelerator pedal 210 input and/or managing the vehicle powertrain by reducing torque output.

The VCS 1 may receive data from the driver-facing camera 206 to monitor behavior of the driver. For example, the VCS 1 may calculate the position of the driver's head and/or eyes so that the system may estimate if the driver is looking at the road. The position of the driver's head and/or eyes may be compared to one or more predefined variables. The one or more predefined variable may include a time window that measure the amount of time the driver may be looking away from the road before sending a warning message. The VCS 1 may output the warning message at the display 4, the instrument panel 204, and/or a combination thereof.

In another embodiment, the VCS 1 may monitor several interior components to calculate aggressive driving. For example, the VCS 1 may monitor the turn signal lever 208 to calculate if the driver is using turn signals during a lane change and/or turn. The VCS 1 may monitor acceleration to calculate an excessive increase in speed of the vehicle 31 within a predefined window of time.

Figure 2B:
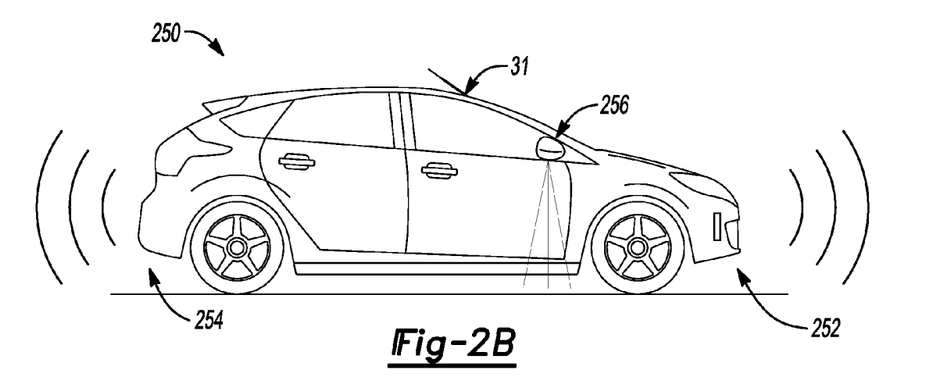
FIG. 2B illustrates a radar system for use with the vehicle-based computing system to monitor driver behavior.

FIG. 2B illustrates a radar system 250 for use with the vehicle-based computing system 1. The radar system 250 is an object detection system that may identify the range, direction, and/or speed for both moving and fixed objects. The VCS 1 may receive information from the radar system 250 to calculate a position of objects in the range of the vehicle 31.

The radar system 250 may include a front radar device 252, a rear radar device 254, and a side detection device 256. In one embodiment, the radar system 250 may use one or more components to calculate a range, direction, and/or speed of an object. The one or more components may include a transmitter that emits radio waves, a receiver that may capture the reflected radar signals, one or more cameras used to visual capture objects, and/or a combination thereof.

The front radar device 252 may include a transmitter to emit and receive radio waves to detect objects in front of the vehicle 31. The rear radar device 254 may include a transmitter to emit and receive radio waves to detect objects in the rear of the vehicle 31. The side detection device 256 of the vehicle may include at least one of a camera, radar, a video sensor, a laser sensor, and an infrared sensor to detect lane departure. In another embodiment, the side detection device 256 may be configured to detect an object in a vehicle blind spot.

The VCS 1 may receive object detection data including lane departure information from the radar system 250. For example, the VCS 1 may receive range information via the front radar device 252 for an object in front of the vehicle 31. The VCS 1 may receive the range information for use to monitor driver behavior and manage aggressive driving behavior.

Figure 3:
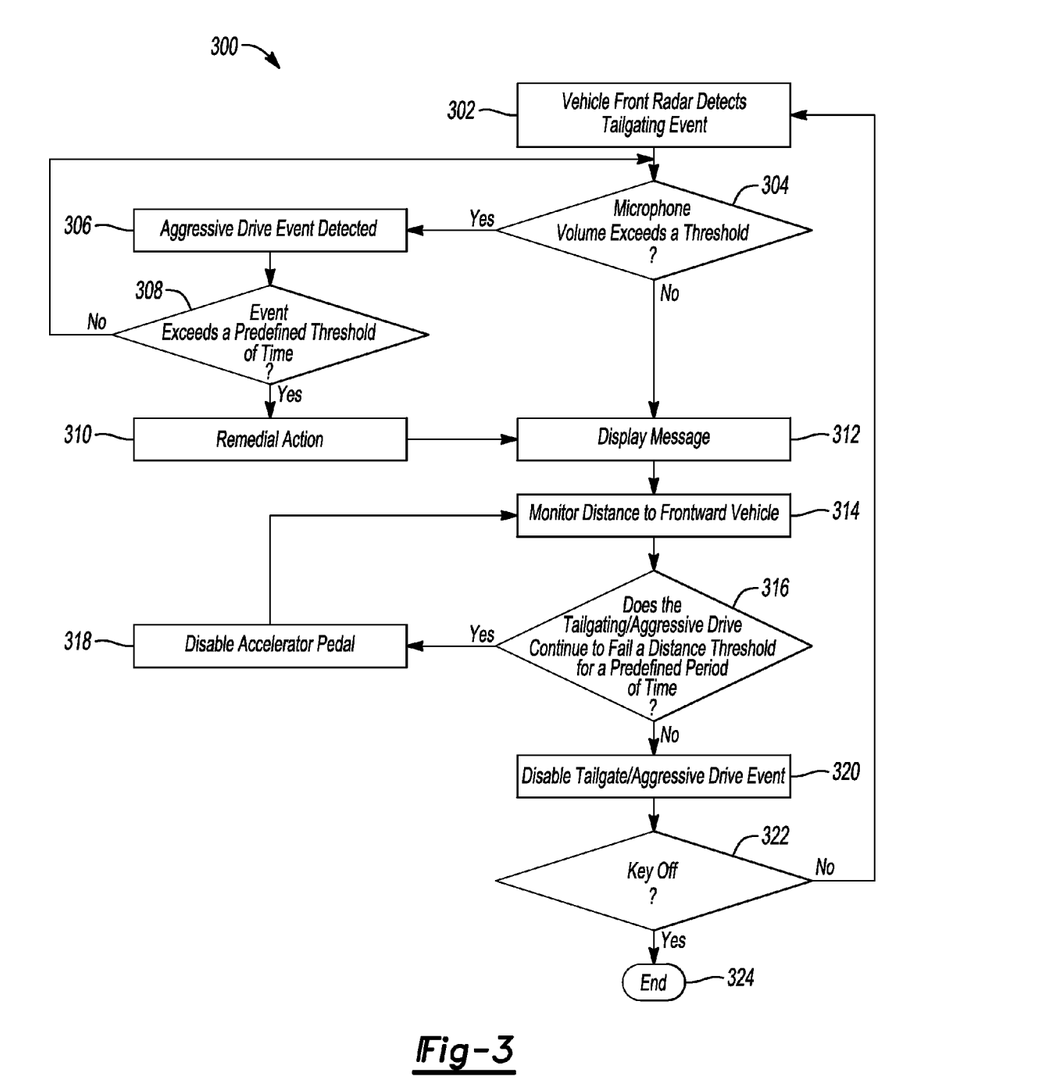
FIG. 3 is a flow chart illustrating an example method to monitor driver behavior.

FIG. 3 is a flow chart illustrating an example method to monitor driver behavior. The driver monitoring method may comprise one or more software applications that are executed on hardware at the vehicle computing system 1. The one or more applications may include instructions to communicate with one or more components of the vehicle and monitor driver behavior. The method 300 may be implemented using software code contained within the VCS 1. In other embodiments, the method 300 may be implemented in other vehicle controllers, at a remote server in communication with the VCS 1, distributed amongst multiple vehicle controllers, or a combination thereof.

Referring again to FIG. 3, the vehicle and its components illustrated in FIG. 1, FIG. 2A, and FIG. 2B are referenced throughout the discussion of the method 300 to facilitate understanding of various aspects of the present disclosure. The method 300 of monitoring driver behavior in response to vehicle component inputs may be implemented through a computer algorithm, machine executable code, or software instructions programmed into a suitable programmable logic device(s) of the vehicle, such as the vehicle control module, a control module at the remote server, another controller in communication with the vehicle computing system, or a combination thereof. Although the various operations shown in the flowchart diagram 300 appear to occur in a chronological sequence, at least some of the operations may occur in a different order, and some operations may be performed concurrently or not at all.

In operation 302, the VCS 1 receives a data message comprising tailgating information from the radar system 250. The radar system 250 may gather the tailgating information data from the front radar device 252. For example, the front radar device 252 may detect a frontward vehicle based on the transmitter emitting and receiving radio waves. The VCS 1 may compare the tailgating information data to one or more threshold values to monitor driver behavior. If the tailgating information exceeds the threshold value, the system may generate and transmit one or more remedial actions.

In operation 304, the VCS 1 may monitor a volume level (e.g., the amplitude of sound) of the in-vehicle microphone 29 and compare the volume to a threshold value. For example, the microphone 29 may measure the microphone volume over a moving window of time to determine a baseline noise such that a spike in volume is detected. The threshold value may be a calibratable table of volume levels based on a range of ambient noise (e.g., baseline of noise measured in the vehicle cabin). The baseline noise may comprise volume levels based on one or more factors including radio volume, vehicle speed, wind noise, tire noise, engine noise, and/or a combination thereof. Once the baseline noise is measured, the VCS 1 may set the threshold value and determine if a spike in volume received from the microphone 29 exceeds the threshold value.

In operation 306, the VCS 1 may detect an aggressive drive event based on the tailgating information and the microphone volume level. If the aggressive drive event is detected, the VCS 1 may monitor if the microphone volume and tailgate data continue for a period of time that exceeds a predefined threshold in operation 308. If the aggressive drive event exceeds the period of time threshold value, the VCS 1 may proceed to enable a remedial action in operation 310. The remedial action may include a reduce powertrain power to limit acceleration.

In operation 312, the VCS 1 may output one or more messages at a display 4 to alert the driver of at least one of a tailgating event and/or an aggressive driving event. The VCS 1 may monitor the distance to the frontward vehicle in operation 314.

In operation 316, the VCS 1 may monitor if the tailgating and/or aggressive drive continues based on a distance threshold measured for a predefined period of time. If the tailgating and/or aggressive drive fails the distance threshold for a period of time, the VCS 1 may disable the accelerator pedal based on one or more factors in operation 318. The one or more factors include, but are not limited to, the tailgating event, aggressive drive event, an override request is not received, and/or a combination thereof. The VCS 1 may enable the accelerator pedal once a distance between the vehicle and the frontward vehicle is acceptable.

In operation 320, the VCS 1 may disable the tailgate/aggressive drive event if the distance between the vehicle and the frontward vehicle are at an acceptable threshold. The VCS 1 may monitor for a key off event in operation 322. If a key off event is not detected, the VCS 1 may continue to monitor for a tailgate event. If a key off event is detected, the VCS 1 may begin to power down storing one or more driver behavior information in non-volatile memory while disabling one or more systems in operation 324.

In one example, the VCS 1 may provide one or more methods to disable the tailgate/aggressive drive event remedial actions. For example, the VCS 1 may be configured to have an override button to disable the monitoring of driver behavior and/or the one or more remedial actions. The override button may disable the one or more algorithms and/or the systems executing the algorithms monitoring driver behavior.

Figure 4:
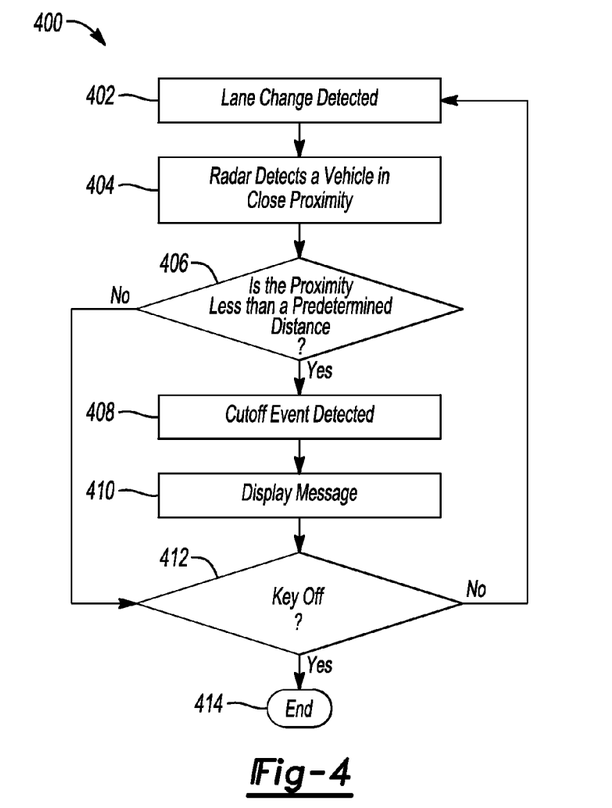
FIG. 4 is a flow chart illustrating an example method of the vehicle-based computing system monitoring a lane change using the radar system.

FIG. 4 is a flow chart illustrating an example method 400 of the VCS 1 monitoring a lane change using the radar system. The method 400 may be implemented using software code contained within the VCS 1. The software code may be executed on hardware within the VCS 1. In other embodiments, the method 400 may be implemented in other vehicle controllers, at a nomadic device 53 in communication with the VCS 1, distributed amongst multiple vehicle controllers, or a combination thereof.

In operation 402, the VCS 1 may receive lane change detection from the radar system 250. The radar system 250 may gather the lane change detection data from the side detection device 256. For example, the side detection device 256 may detect a lane change based on at least one of a camera, a video sensor, a laser sensor, an infrared sensor, and a combination thereof. In response to the lane change detected data, the VCS 1 may initiate one or more driver behavior monitoring algorithms.

In operation 404, the VCS 1 may receive a data message from the radar system 250 of a vehicle in close proximity. The radar system 250 may receive the rearward vehicle data from the radar device 254. For example, the rear radar device 254 may detect a rearward vehicle based on the transmitter emitting and receiving radio waves. The VCS 1 may compare the rearward vehicle data to one or more threshold values to monitor driver behavior. The rearward vehicle data may include how far behind the rearward vehicle is from the vehicle, how fast the rearward vehicle is approaching the vehicle 31, and the location of the rearward vehicle (e.g., determine which lane the rearward vehicle is in).

In operation 406, the VCS 1 may monitor the rearward vehicle data and compare the proximity (e.g., distance) of the rearward vehicle to a predefined distance threshold. The predefined distance threshold may be calibratable table comprising different distance values based on vehicle speed. For example, if the vehicle is moving at highway speeds, the predefined distance threshold may be a smaller value compared to a vehicle moving at residential speeds.

In operation 408, if the proximity of the rearward vehicle is less than a predefined distance, the VCS 1 may enable a cutoff event detection flag. In response to the cutoff event detection flag, the VCS 1 may output one or more messages for display in operation 410.

For example, if a cutoff event is detected, the VCS 1 may transmit a message to at least one of a vehicle display 4, instrument panel 204, a nomadic device 53 in communication with the VCS 1 via Bluetooth, and/or a nomadic device 53 in communication with the VCS 1 via a network 61 server connection.

In operation 412, the VCS 1 may monitor for a key off event. If a key off event is not detected, the VCS 1 may continue to monitor driver behavior by receiving lane change data and/or a rearward vehicle proximity data. If a key off event is detected, the VCS 1 may begin to power down storing one or more driver behavior variables in non-volatile memory while disabling one or more systems in operation 414.

Figure 5:
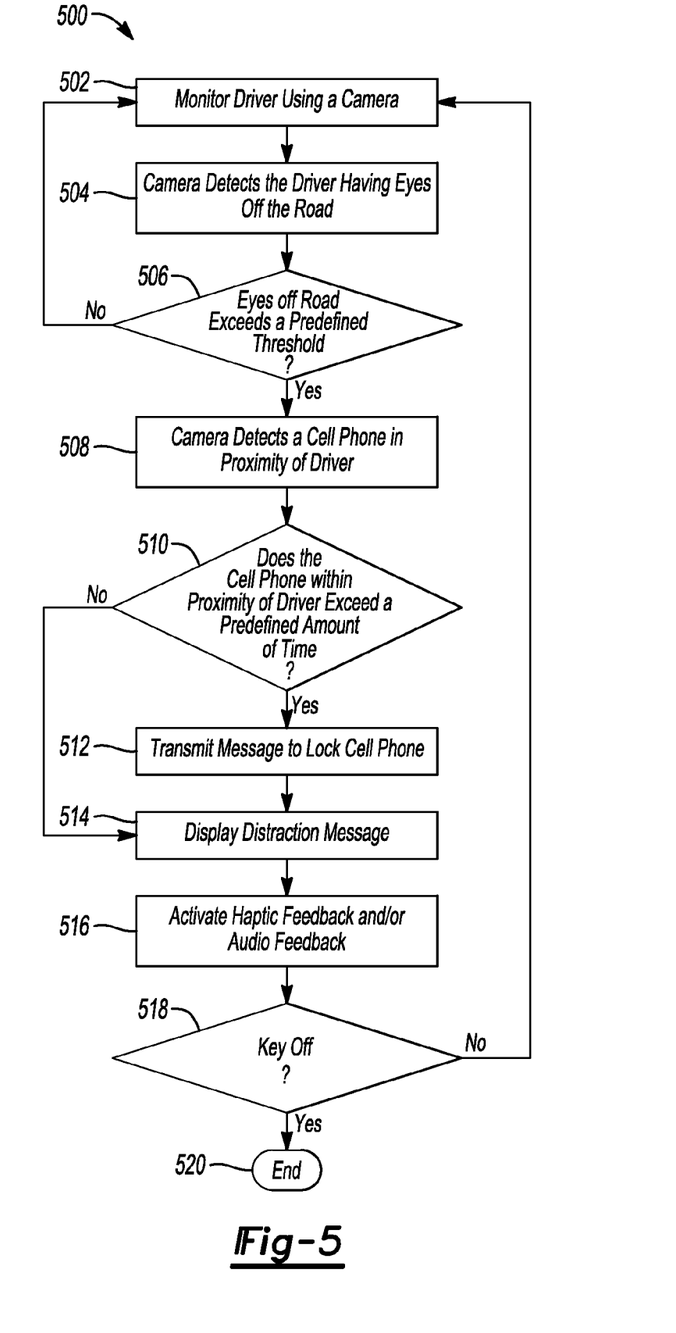
FIG. 5 is a flow chart illustrating an example method of the vehicle-based computing system monitoring driver behavior using a driver-facing camera.

FIG. 5 is a flow chart illustrating an example method 500 of the VCS 1 monitoring driver behavior using the driver-facing camera 206. The VCS 1 may monitor the driver using the driver-facing camera 206 in operation 502. The camera 206 may be configured to recognize orientation and direction of the driver's head and/or eyes. The camera 206 may transmit driver head and/or eye orientation data to the VCS 1.

In operation 504, the driver head and/or eye orientation data may include the camera detecting the driver's eyes off the road. In response to the head/eye orientation data, the VCS 1 may measure the amount of time the driver's eyes are off the road. The VCS 1 may compare the amount of time the driver's eyes are off the road to a predefined threshold in operation 506. In another example, the VCS 1 may determine that the head orientation of the driver is positioned such that the view of the road is obstructed, the VCS 1 may measure and compare the amount of time the driver's head is in that position. If the VCS 1 outputs a measurement determining that the driver's eyes and/or head orientation is positioned such that the view of the road is obstructed, the VCS 1 may request additional data from the camera 206.

In operation 508, the camera 206 may detect a nomadic device (e.g., cell phone) in proximity to the driver. For example, the camera 206 may capture the cell phone in the driver's hand. In another example, the VCS 1 may detect the proximity of the cellphone to the driver using several methods including, radio frequency strength, Bluetooth signal strength measurement, etc. The VCS 1 may measure the amount of time the cell phone is in possession of the driver. The VCS 1 may compare the amount of time the driver is focused on the cell phone and compare that amount of time to a predefined threshold value in operation 510.

For example, the driver-facing camera 206 may detect the driver positioning his head and/or eyes towards a nomadic device 53. The VCS may receive the data from the camera and begin a timer to track the amount of time the driver looks at the nomadic 53. If the driver's head and/or eyes spend an amount of time facing/looking at the nomadic device, the VCS may being to enable one or more remedial actions.

In operation 512, if the driver is focused on the nomadic device for a period of time that exceeds a predetermined threshold, the VCS 1 may transmit a message to the device requesting a user lock-out. For example, the device may be configured to communicate with the VCS 1 using short range wireless communication (e.g., Bluetooth). The VCS 1 may transmit a message for display alerting the driver of the potential distraction. In another example, the VCS 1 may be able to transmit a user interface screen lock-out request to the device via an application program interface (API).

In operation 514, the VCS 1 may output an alert message for display at one or more devices. For example, the VCS 1 may output a warning message at the display 4 notifying the driver of a driving behavior threshold being exceeded based on the data received from the camera.

In operation 516, the VCS 1 may activate one or more haptic feedback and/or audio feedback to the driver based on a driving behavior exceeding one or more thresholds. For example, the vehicle may comprise one or more haptic feedback devices such as a vibrating seat. The one or more haptic feedback devices integrated within the vehicle cabin 200 may include an electroactive polymers, piezoelectric, electrostatic, and subsonic audio wave surface action. In one example, the VCS 1 may output a message to vibrate the steering wheel to alert the driver of a potential distraction.

In operation 518, the VCS 1 may monitor for a key off event. If a key off event is not detected, the VCS 1 may continue to monitor the driver using the camera 206. If a key off event is detected, the VCS 1 may begin to power down storing one or more driver behavior variables in non-volatile memory while disabling one or more systems in operation 520.

Figure 6:
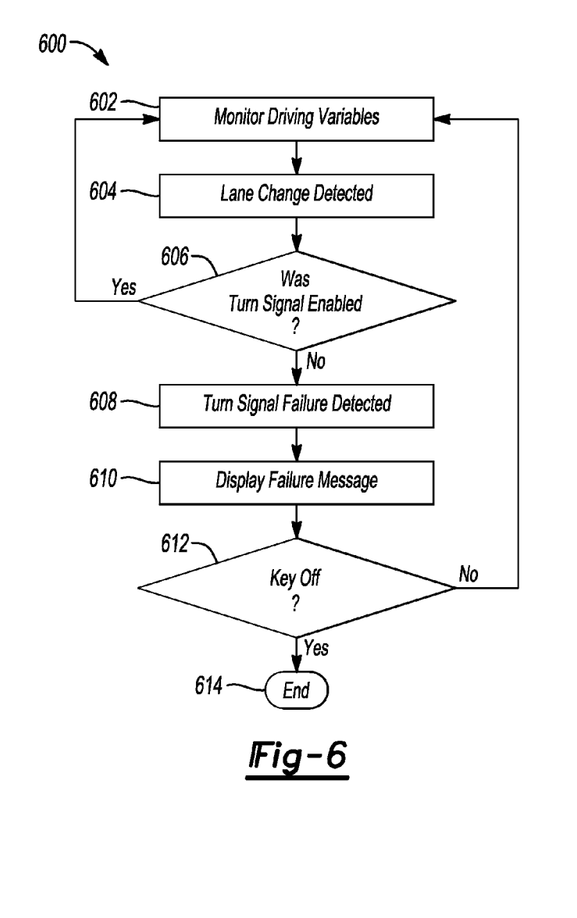
FIG. 6 is a flow chart illustrating an example method of the vehicle-based computing system monitoring driver behavior using vehicle interior components.

FIG. 6 is a flow chart illustrating an example method 600 of the VCS 1 monitoring driver behavior using vehicle interior components. The VCS 1 may communicate with vehicle interior components to determine aggressive and/or distracted driving. The interior components may include a turn signal lever 208 used to indicate to others outside the vehicle when the driver is going to control the vehicle to change between lanes or make a turn.

In operation 602, the VCS 1 may monitor one or more driving variables including vehicle speed, accelerator pedal position, brake pedal position, cruise control selections, and a combination thereof. The VCS 1 may receive data comprising a lane detection change from the radar system 250 in operation 604.

In operation 606, the VCS 1 may determine if the turn signal 208 was enabled during the lane change detection. For example, in response to the lane change detection, the VCS 1 may monitor the turn signal lever 206. If the turn signal lever 208 was not enabled during a lane change detection, the VCS 1 may enable a turn signal failure message in operation 608.

In operation 610, the VCS 1 may output the turn signal failure message to the display 4, instrument panel 204, the nomadic device 53 in communication with the VCS 1, and/or a combination thereof. The VCS 1 may monitor for a key off event in operation 612. If a key off event is not detected, the VCS 1 may continue to monitor driving behavior using one or more vehicle interior components. If a key off event is detected, the VCS 1 may begin to power down storing one or more driver behavior variables in non-volatile memory while disabling one or more systems in operation 614.

Figure 7:
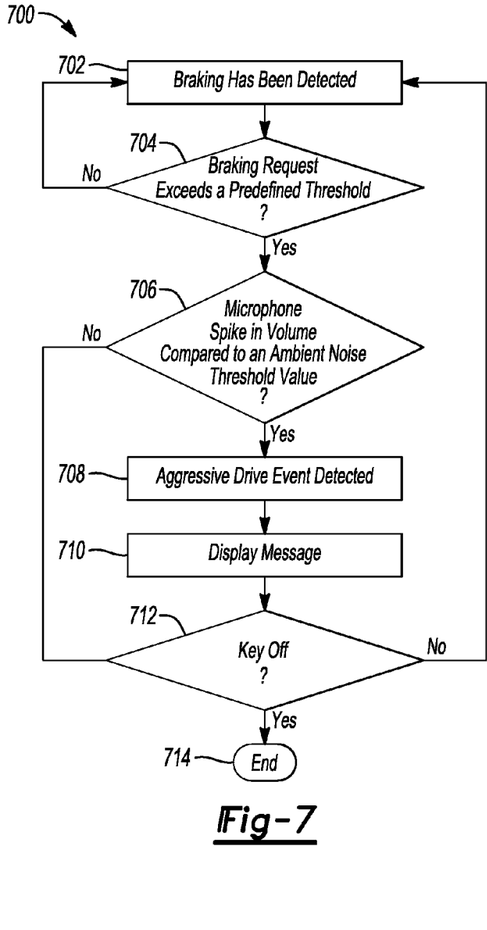
FIG. 7 is a flow chart illustrating an example method of the vehicle-based computing system monitoring driver behavior using a microphone in the vehicle interior.

FIG. 7 is a flow chart illustrating an example method 700 of monitoring driver behavior using the microphone 29 in the vehicle interior. The method 700 may be implemented using software code contained and executed within the VCS 1. The VCS 1 may monitor driver behavior using the microphone 29 in combination with one or more components located in the vehicle cabin 200. The one or more components may include the brake pedal 212.

In operation 702, the VCS 1 may detect a braking event via input received from the brake pedal 212. The VCS 1 may compare the brake request to a predefined threshold value in operation 704.

For example, the VCS 1 may monitor the position of the brake pedal 212 to determine if the brake request is for an immediate stop based on the predefined threshold value. The predefined threshold value may be a calibratable table comprising brake pedal positions in relation to vehicle speed. If the brake request exceeds the predefined threshold indicating a driving scenario of an immediate stop and go driving event, the VCS 1 may enable an aggressive driving behavior flag.

In operation 706, the VCS 1 may monitor if the microphone 29 detects a spike in the volume level compared to the volume of a baseline noise threshold value. If a volume spike is detected in combination with a braking event exceeding a threshold value, the VCS 1 may detect an aggressive drive event in operation 708.

In operation 710, the VCS 1 may output one or more messages based on the detection of the aggressive drive event. The one or more messages may include a notification to a remote nomadic device receiving information from the VCS 1 via a network 61 connection. For example, an owner of the vehicle, located remotely from the vehicle, may receive messages based on the detection of the aggressive driving event from the VCS 1 communicating with the server 61.

In operation 712, the VCS 1 may monitor for a key off event. If a key off event is not detected, the VCS 1 may continue to detect the aggressive driving event via brake pedal 212 input and microphone 29 volume data. If a key off event is detected, the VCS 1 may begin to power down storing one or more driver behavior values in non-volatile memory while disabling one or more systems in operation 714.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle computing system comprising:
   a radar system configured to measure a distance to a frontward-vehicle;
   a microphone configured to measure cabin noise; and
   at least one controller configured to,
      output a tailgating indicator when the measured distance is less than a predefined threshold,
      in response to the tailgating indicator, measure cabin noise from the microphone, and
      if the noise is greater than a threshold value, output an alert message.

2. The vehicle computing system of claim 1, wherein the at least one controller is further configured to enable one or more remedial actions based on the alert message.

3. The vehicle computing system of claim 2, wherein the one or more remedial actions is at least one of an accelerator pedal disable request, a reduce powertrain torque request, and a warning message at a display.

4. The vehicle computing system of claim 1, wherein the at least one controller is further configured to
   detect a lane change via the radar system configured to measure a distance to a rearward-vehicle,
   monitor a turn signal lever, and
   if the turn signal lever is inactive, output the alert message.

5. The vehicle computing system of claim 1, wherein the at least one controller is further configured to establish communication with a nomadic device via a transceiver; and transmit the alert message to the nomadic device.

6. The vehicle computing system of claim 1, wherein the at least one controller is further configured to monitor brake pedal input based on a predefined calibratable table, and if the brake pedal input exceeds an aggressive driving threshold, output the alert message.

7. The vehicle computing system of claim 6, wherein the predefined calibratable table is based on vehicle speed and a position of the brake pedal.

8. The vehicle computing system of claim 1, wherein the at least one controller is further configured to receive a measurement of vehicle cabin noise using the microphone during a moving window of time to set the threshold value such that a spike in volume is detected.

9. The vehicle computing system of claim 8, wherein the noise is volume levels based on radio volume, wind noise, tire noise, and engine noise.

10. A non-transitory computer-readable storage medium, storing instructions, which, when executed by a vehicle computing system, cause the system to perform a method comprising:
   detecting a tailgating event based on data from a radar system;
   comparing vehicle cabin volume to a baseline threshold value during the tailgating event; and
   if the vehicle-cabin volume exceeds the baseline threshold value, outputting a remedial action.

11. The non-transitory computer-readable storage medium of claim 10, wherein the remedial action is at least one of a reduced powertrain torque, an accelerator pedal disable request, and a warning message at a display.

12. The non-transitory computer-readable storage medium of claim 11, wherein the reduced powertrain torque is a calibration map limiting powertrain torque output.

13. The non-transitory computer-readable storage medium of claim 11, wherein the accelerator pedal disable request is at least one of a torque calibration map disabling torque input via an accelerator pedal.

14. The non-transitory computer-readable storage medium of claim 10, storing additional instruction that cause the system to:
   detecting a lane change event via the radar system configured to measure a distance to a rearward-vehicle,
   monitoring a turn signal lever, and
   if the turn signal lever is inactive, output an alert message.

15. The non-transitory computer-readable storage medium of claim 14, storing additional instruction that cause the system to establishing communication with a nomadic device via a transceiver; and transmitting the alert message to the nomadic device.

16. The non-transitory computer-readable storage medium of claim 10, storing additional instruction that cause the system to monitoring brake pedal input based on a predefined calibratable table, and if the brake pedal input exceeds an aggressive driving threshold, outputting an alert message.

17. The non-transitory computer-readable storage medium of claim 16, wherein the predefined calibratable table is based on vehicle speed and a position of the brake pedal.

18. The non-transitory computer-readable storage medium of claim 10, storing additional instructions that cause the system to measuring noises via a microphone during a moving window of time to set the threshold value such that a spike in volume is detected.

19. An aggressive driving detection method comprising:
   detecting a tailgating event based on a distance to a frontward-vehicle, via a radar system, when the distance is less than a predefined frontward-vehicle threshold,
   in response to detecting the tailgating event, requesting in-vehicle cabin noise from a microphone, and
   if the noise is greater than a threshold value, outputting an alert message.

20. The aggressive driving detection method of claim 19, wherein the alert message is at least one of an accelerator pedal disable request, a reduce powertrain torque request, and a warning message at a display.

* * * * *